United States Patent [19]

Rasshofer

[11] Patent Number: 4,724,252

[45] Date of Patent: Feb. 9, 1988

[54] POLYAMINES AND A PROCESS FOR THEIR PRODUCTION FROM POLYISOCYANATES

[75] Inventor: Werner Rasshofer, Cologne, Fed. Rep. of Germany

[73] Assignee: Bayer Akitengesellschaft, Leverkusen, Fed. Rep. of Germany

[21] Appl. No.: 895,629

[22] Filed: Aug. 11, 1986

[30] Foreign Application Priority Data

Aug. 27, 1985 [DE] Fed. Rep. of Germany ....... 3530476

[51] Int. Cl.[4] .............................................. C08G 18/83
[52] U.S. Cl. .................................... 525/452; 525/453; 525/460; 528/44; 528/59; 560/25; 560/26; 560/115; 560/158
[58] Field of Search ....................... 525/452, 453, 460; 528/44, 59; 560/25, 26, 115, 158

[56] References Cited

U.S. PATENT DOCUMENTS

| | | | |
|---|---|---|---|
| 2,888,439 | 5/1959 | Simons | 260/77.5 |
| 3,044,989 | 7/1962 | Shivers, Jr. | 260/77.5 |
| 3,385,829 | 5/1968 | Heydkamp et al. | 260/75 |
| 3,625,871 | 12/1971 | Trumbel | 260/2.5 |
| 3,808,250 | 4/1974 | Blahak et al. | 260/455 |
| 3,814,707 | 6/1974 | Möller | 260/2.5 |
| 3,865,791 | 2/1975 | Brinkmann et al. | 260/77.5 |
| 4,129,741 | 12/1978 | Schmidt | 560/50 |
| 4,153,801 | 5/1979 | Schmidt | 548/312 |
| 4,169,206 | 9/1979 | Mazanek et al. | 560/50 |
| 4,180,644 | 12/1979 | Marquis | 528/68 |
| 4,224,417 | 9/1980 | Hajek et al. | 521/166 |
| 4,234,693 | 11/1980 | Wooler | 521/107 |
| 4,247,677 | 1/1981 | Schmidt | 528/68 |
| 4,260,557 | 4/1981 | Mazanek et al. | 260/455 |
| 4,260,729 | 4/1981 | Schmidt | 528/68 |
| 4,328,330 | 5/1982 | Wellner et al. | 528/45 |
| 4,386,218 | 5/1983 | Rasshofer | 564/38 |
| 4,504,648 | 3/1985 | Otani et al. | 528/76 |
| 4,515,923 | 5/1985 | Fauss et al. | 525/127 |
| 4,565,645 | 1/1986 | Salzburg et al. | 521/159 |

FOREIGN PATENT DOCUMENTS

| | | |
|---|---|---|
| 3131252 | 8/1981 | Fed. Rep. of Germany . |
| 2948419 | 8/1981 | Fed. Rep. of Germany . |
| 3023202 | 1/1982 | Fed. Rep. of Germany . |
| 007829 | 1/1980 | Japan . |
| 1033912 | 6/1966 | United Kingdom . |
| 1117494 | 6/1968 | United Kingdom . |
| 1585455 | 3/1981 | United Kingdom . |

OTHER PUBLICATIONS

C. Naegeli et al, Helv. Chim. Acta, 21, p. 1100, 1938.
H. John in J. Prakt. Chemie, 130, p. 314 et seq. 1931.
H. John in J. Prakt, Chemie, 130, p. 332 et seq. 1931.
N. V. Sidgwick, "The Organic Chemistry of Nitrogen", Clarendon Press, Oxford, p. 326 (1966).
J. March, "Advanced Organic Chemistry: Reactions, Mechanisms and Structure", McGraw-Hill Book Co., N.Y., p. 658, 1968.
Organic Syntheses, Coll. vol. IV, p. 819, 1963.
E. Mohr, J. Prakt., Chem. 71, p. 133, 1905.

*Primary Examiner*—Maurice J. Welsh
*Attorney, Agent, or Firm*—Gene Harsh; Joseph C. Gil; Lyndanne M. Whalen

[57] ABSTRACT

Polyamines containing aromatically bound primary amino groups are prepared in a single stage process by hydrolyzing an isocyanate in the presence of a compound containing an amidine and/or guanidine group and a water-miscible, aprotic-dipolar solvent. This hydrolysis is carried out at from 20° to 210° C. with the reactants being in substantially homogeneous phase. The isocyanate starting material contains aromatically bound NCO groups and has NCO content of from 0.5 to 40 wt. %. The compound containing amidine and/or guanidine groups functions as a catalyst and is used in a quantity of at least 0.001 parts by weight for every 100 parts by weight of isocyanate. The water-miscible solvent is used in a quantity of at least 10 parts by weight for every 100 parts by weight of polyisocyanate. The polyamines thus-produced are particularly useful in the production of polyurethanes.

15 Claims, No Drawings

POLYAMINES AND A PROCESS FOR THEIR PRODUCTION FROM POLYISOCYANATES

BACKGROUND OF THE INVENTION

This invention relates to a simplified single-stage process for the production of polyamines containing aromatic primary amino groups.

It is known that aromatic isocyanates may be converted into primary aromatic amines by acidic hydrolysis. Unfortunately, the reaction is far from complete, because the amine formed during hydrolysis reacts with unreacted isocyanate to form the corresponding urea. This further reaction cannot be prevented even by using excess strong mineral acid. A more recent example of this process can be found in JP-PS No. 55 007 829.

It is also known that isocyanates can be converted into amines in the presence of acid or basic catalysts, as disclosed for example in N. V. Sidgwick, The Organic Chemistry of Nitrogen, Clarendon Press, Oxford, page 326 (1966) and in J. March, Advanced Organic Chemistry: Reactions, Mechanisms and Structure, McGraw-Hill Book Co., New York, page 658 (1968). Although Sidgwick mentions alkaline hydrolyzability of NCO groups, his comments are very general in nature. March, discloses that the hydrolysis of isocyanates and isothiocyanates to amines can be catalyzed by acids and bases. It is also known, for example in the Curtius or Lossen degradation of acid azides and hydroxamic acids that the intermediate isocyanates may be decomposed with aqueous acid to amine salts. One such process is described, for example, in Organic Syntheses, Coll. Vol. IV, 819 (1963) with respect to the production of putrescin hydrochloride.

E. Mohr, J. Prakt. Chem., 71, 133 (1905) discloses that phenylisocyanate is affected in the cold more quickly by dilute sodium hydroxide than by water. According to C. Naegeli et al., Helv. Chim. Acta, 21, 1100 (1938), phenylisocyanates substituted by electron acceptors (such as nitro groups, halogen atoms or acyl groups) can be converted into the corresponding monoamines over a period of from a few minutes to 1 hour by hydrolysis in moist ether or acetone containing 1% of water (i.e. in the absence of acids or bases) during the reaction. From 2,4-dinitrophenylisocyanate, the corresponding amine is obtained in a yield of almost 100% in hot water (even in the absence of solvent) without any urea-forming secondary reaction.

DE-B No. 1,270,046 describes a process for the production of defined, primary aromatic amines containing polyalkylene glycolether segments, in which reaction products of aromatic diisocyanates or triisocyanates with polyalkylene glycolethers and/or polyalkylene glycolthioethers (preferably those having molecular weights of from 400 to 4000) are reacted with secondary or tertiary carbinols and then subjected to thermal decomposition at high temperatures in an inert solvent (optionally in the presence of acidic catalysts). The high decomposition temperature and the formation of inflammable, readily volatile alkenes which are explosive in admixture with air during thermal decomposition of the urethane are disadvantages of this disclosed process.

DE-B No. 1,694,152 discloses production of prepolymers containing at least two terminal amino groups by reaction of hydrazine, aminophenyl ethylamine or other diamines with an NCO prepolymer of a polyether polyol and polyisocyanate (NCO:NH ratio 1:1.5 to 1:5). Unreacted amine has to be carefully removed in another step because it has a strong catalytic effect on the reaction with polyisocyanates, leading to short processing times.

Another method of synthesizing polyamines containing urethane groups is described in French Patent No. 1,415,317. NCO prepolymers containing urethane groups are converted with formic acid into the N-formyl derivatives which are hydrolyzed to terminal aromatic amines. The reaction of NCO prepolymers with sulfamic acid in accordance with DE-P No. 1,155,907 also gives amino terminated compounds. In addition, DE-B No. 1,215,373 discloses that relatively high molecular weight aliphatic preadducts containing secondary and primary amino groups may be obtained by reaction of relatively high molecular weight hydroxyl compounds with ammonia under pressure at elevated temperature in the presence of catalysts. U.S. Pat. No. 3,044,989 discloses that such compounds may be obtained by reaction of relatively high molecular weight polyhydroxyl compounds with acrylonitrile, followed by catalytic hydrogenation. According to DE-A No. 2,546,536 and U.S. Pat. No. 3,865,791, relatively high molecular weight terminal compounds may also be obtained by reaction of NCO prepolymers with eneamines, aldimines or ketimines containing hydroxyl groups, followed by hydrolysis. Another possibility for synthesizing polyamines containing urethane and ether groups lies in the ring opening which occurs during the reaction of isatoic acid anhydride and diols. Polyamines such as these are described, for example, in U.S. Pat. No. 4,180,644 and in DE-A Nos. 2,019,432, 2,619,840, 2,648,774 and 2,648,825. The poor reactivity of the aromatic ester amines obtained in this way is a disadvantage in numerous applications.

Poor reactivity is also a disadvantage of the compounds containing amino and ester groups which may be obtained in accordance with U.S. Pat. No. 4,504,648 by reaction of polyether polyols with p-aminobenzoic acid ethylester. Those amino compounds which may be obtained, by reaction of polyols with nitrobenzoic acid ethylester and subsequent reaction of the nitro groups to amino groups also exhibit poor reactivity.

The reaction of nitroaryl isocyanates with polyols and subsequent reduction of the nitro groups to aromatic amines is also known (U.S. Pat. No. 2,888,439). The primary disadvantage of such processes lies in the high costs of the reduction step.

It is also known that certain heteroaromatic isocyanic acid esters may be converted into heteroaromatic amines by basic hydrolysis. However, the hydrolysis conditions described by H. John in J. Prakt. Chemie 130, 314 et seq and 332 et seq (1931) for two specific heteroaromatic monoisocyanic acid esters are not only totally unsuitable for the conversion of poly-NCO-compounds into aliphatic and/or aromatic amines, they are also dangerous.

Applicants themselves have proposed multistage processes for the production of polyamines by alkaline hydrolysis of NCO preadducts with excess quantities of base (alkali hydroxides) at low temperatures to carbamates, acidification with equivalent of excess quantities of mineral acids or acidic ion exchanger resins with carbamate decomposition, optionally followed by neutralization of excess quantities of acid with bases, and subsequent isolation of the polyamines (See, for example, DE-A Nos. 2,948,419 and 3,039,600 (believed to correspond to U.S. Pat. No. 4,386,218)).

According to DE-OS No. 3,131,252, the carbamates prepared in a first stage by hydrolysis with alkali hydroxides may be decomposed by subsequent heat treatment to form polyamines.

Single-stage processes are described in DE-OS Nos. 3,223,400, 3,223,398 and 3,223,397. In these processes, "ether solvents" are used together with tertiary amines as catalysts (DE-OS No. 3,223 400): polar solvents, such as dimethylformamide, together with $\geq 0.1$ part to 100 parts of isocyanate compound) of tertiary amine or with 0.1 to 10 g of alkali hydroxides, alkali silicates, alkali cyanides as catalysts (DE-OS No. 3,223,398); polar solvents, such as DMF, together with 0.01 to 25 wt. % of carbonates or carboxylates as catalysts in DE-OS No. 3,223,397.

These known processes for the production of polyamines are all complicated. Even in the last-mentioned, simpler processes for the convesion of polyisocyanates into polyamines, further simplification would be desirable to enable polyamines to be obtained more economically. The following features of a process of producing polyamines would be advantageous;

(1) no filtration step necessary,
(2) no separation of a tertiary amine catalyst by distillation necessary,
(3) drastic reduction in the necessary catalytic quantity of tertiary amines (DE-OS No. 3,223,398) and
(4) substantially quantitative conversion of NCO groups into $NH_2$ groups.

SUMMARY OF THE INVENTION

It has now been found that polyamines containing aromatically bound primary amino groups can be obtained by single-stage hydrolysis of polyisocyanates to polyamines in substantially quantitative yields without the filtration, separation and large quantities of tertiary amine catalyst required in prior art processes. This is achieved by hydrolyzing an isocyanate in the presence of a compound containing amidine and/or guanidine groups and in the presence of dipolar-aprotic solvents at a temperature of $\geq 20°$ C., preferably $\geq 35°$ C., most preferably $\geq 50°$ C.

DETAILED DESCRIPTION OF THE INVENTION

The present invention relates to a process for the production of polyamines containing aromatic primary amino groups by hydrolysis of compounds containing aromatic NCO groups in aqueous basic media in a single-stage process. More specifically, compounds containing aromatic NCO groups with an NCO content of from 0.5 to 40 wt. %, preferably from 1.2 to 25 wt. % and more preferably from 1.5 to 15 wt. % are hydrolyzed with water in the presence of at least on acyclic, cyclic or polycyclic compound containing at least one amidine and/or guanidine structural unit as catalyst in quantities of 0.001 part by weight to 100 parts by weight of compound containing aromatic NCO groups and in the presence of a water-miscible, aprotic-dipolar solvent in a quantity of at least 10 parts by weight for every 100 parts by weight of compound containing aromatic NCO groups. This hydrolysis is carried out in substantially homogeneous phase at a temperature in the range of from 20° to 210° C., preferably $\geq 35°$ C., more preferably $\geq 50°$ C. and $\leq 165°$ C.

In the invention, diazabicycloalkenes, tetrahydropyrimidines and tetraalkyl guanidines are preferably used as the catalyst. The catalyst are preferably used in substantially dissolved form.

The hydrolysis of the present invention is preferably carried out in the presence of water in from 1 to 10 times the stoichiometric quantity, based on NCO, and in the presence of a water-miscible solvent containing carboxylic acid dialkylamide, lactam, tetraalkyl urea, sulfone, sulfoxide and/or phosphorus dialkylamide groups which solvent boils at a temperature in the range of from 56° to 250° C. Such solvent is used in quantities of $\geq 50$ parts by weight to 100 parts by weight of compound containing aromatic NCO groups.

The hydrolysis is most advantageously carried out at temperatures in the range from 75° to 135° C.

The NCO compounds preferably used are NCO prepolymers based on relatively high molecular weight, difunctional or trifunctional polyether, polyester, polycarbonate and/or polycaprolactone polyols which have an aromatic NCO content of from 1.5 to 15 wt. %.

It is also of advantage to carry out hydrolysis of the polyamines in a continuous reaction.

The invention also relates to the polyamines obtained by the process described above. These polyamines contain from 0.58 to 6.7 wt. % of $NH_2$ groups and may be used as a reaction component in the production of polyurethanes.

Water-soluble solvents are useful in the process of the present invention to obtain a substantially homogeneous solution of tbe reactant, NCO compound, water, and the catalyst. One particularly suitable solvent is dimethyl formamide.

It is known (e.g., from DE-AS No. 1,235,499) that solutions of NCO prepolymers in dimethyl formamide may be converted into highly viscous solutions suitable for spinning elasthane filaments or for coatings using substantially equivalent quantities of water (80 to 120% of the theoretical) with chain extension through urea groups. That a different reaction occurred when the NCO compound is reacted with an excess quantity of water in the presence of an amidine and/or guanidine compound and that low molecular weight amines are obtained is surprising in view of the fact that amidine and/or guanidine compounds are known to hydrolyze rapidly to catalytically inactive compounds.

It is also known that isocyanates react with dialkyl formamides to form formamidines (H. Ulrich et al, J. Org. Chem. 33, 3928–3930 (1968)). This reaction does not however interfere with the smooth hydrolysis reaction to polyamines in the process of the present invention.

A considerable advantage of the process of the present invention lies in the fact that, in the presence of the amidine and/or guanidine catalyst required in the present invention, no salt formation occurs upon elimination of the $CO_2$. The use of known alkali hydroxides (DE No. 3,131,252) results in formation of considerable quantities of alkali (hydrogen) carbonates which must be filtered off.

Since the amidine and/or guanidine catalyst(s) used in accordance with the present invention is (are) readily soluble in the reaction medium, the distribution equilibria encountered in cases where rapidly sedimenting alkali carbonates or hydrogen carbonates are used (as in DE-OS No. 3,223,397) do not occur. Because they remain in solution or are totally miscible, the catalysts do not have to be filtered off either. In general, the quantities of catalyst remaining in the amine product are not troublesome by virtue of the small quantity preferably used. In addition, compounds which are not catalytically active or which at least are far less catalytically active in regard to the isocyanate polyaddition reaction generally form during the reaction, during working up of the reaction mixture and during storage of the amine product.

The catalysts of the present invention are particularly suitable for the hydrolysis of NCO prepolymers based on polyesters, because the mild reaction conditions do not promote splitting of the ester group to any significant extent during the hydrolysis reaction. These catalysts are readily obtainable, inexpensive and may optionally be re-used after separation. In addition, these catalysts also show less interaction with alkali-hydrolyzable solvents, such as dimethyl formamide. By contrast, where strongly basic alkali hydroxides are used, dimethyl formamide for example undergoes distinct hydrolysis.

Small quantities of a compound containing one, two or more hydroxy and/or amino and/or thiol groups attached to aliphatic, cycloaliphatic or aromatic residues may optionally be used in the process of the present invention. The use of such compounds containing "H-active groups" make it possible to produce polyamines which are substantially free from monomeric polyamine from NCO compounds (for example NCO semiprepolymers containing low molecular weight polyisocyanates) without treatment of the NCO compounds by thin-layer distillation or similar processes. Modified polyamines additionally containing in one molecule polyamine segments attached through urethane groups, thiourethane groups or urea groups (optionally of different kinds) may also readily be obtained in a single reaction step.

A trifunctional or higher polyamine may also be obtained for example from a difunctional NCO compound, by using a trifunctional or higher compound containing "H-active groups" in the NCO hydrolysis reaction. The products obtained contain particularly small amounts of monomeric amine.

The NCO compounds containing two or more aromatic NCO groups which may be used in the process of the present invention (hereinafter referred to as "NCO compounds") are modified polyisocyanates of the type obtained by conversion of some of the isocyanate groups to urethane, urea, biuret, uret dione, isocyanurate and/or uretone imine groups: or so-called NCO prepolymers of polyfunctional compounds containing NCO-reactive H-groups and having a molecular weight of from 62 to 12,000 and preferably from 400 to 6000 and (excess) quantities of aromatic polyisocyanates or, optionally, semiprepolymers of NCO prepolymers and additional low molecular weight polyisocyanates.

Examples of suitable modified aromatic polyisocyanates include polyisocyanates containing urethane groups (formed by modification with low molecular weight polyols), ployisocyanates containing urea groups (modification with water, DE-PS No. 1,230,778), polyisocyanates containing biuret groups (U.S. Pat. Nos. 3,124,605 and 3,201,372, GB-PS No. 899,050), polyisocyanates containing isocyanurate groups (DE-PS Nos. 1,022,789 and 1,222,067) and dimeric or oligomeric polyisocyanates containing dione or uretone imine groups. All of these modified aromatic polyisocyanates are known compounds or may be obtained by known methods. Several uret dione polyisocyanates are described in Analytical Chemistry of the Polyurethanes, Vol. 16/III, High Polymers Series (Wiley 1969).

Modified polyisocyanates containing urethane and/or urea and/or biuret and/or uret dione and/or isocyanurate and/or uretone imine groups, which are suitable for use in the process of the present invention generally have an NCO content of from 5 to 40 wt. %, preferably from 10 to 25 wt. %.

The NCO compounds used in the process of the present invention are preferably NCO prepolymers of the type obtained in known manner by reaction of low molecular weight and/or relatively high molecular weight compounds containing hydroxy and/or amino and/or thiol groups as reactive groups (molecular weight from 62 to approx. 12,000) with an excess of polyisocyanate. Polyisocyanates and low molecular weight and/or relatively high molecular weight compounds containing hydroxy and/or amino and/or thiol groups as reactive groups (molecular weights from 60 to approx. 12,000) suitable for this reaction are listed on pages 12 to 23 of DE-OS No.3,223,397.

NCO prepolymers obtained from relatively high molecular weight polyols (molecular weight 400 to 12,000), preferably polyether polyols, optionally in the presence of chain-extending agents (molecular weight 62 to 399), by reaction with aromatic diisocyanates in an equivalent ratio of from 1:1.5 to 1:2.8 (preferably of from about 1:1.5 to 1:2) are preferably used in the process of the present invention.

The NCO prepolymers used have an NCO content of from 0.5 to 30 wt. % and preferably of from 1.2 to 25 wt. %. However, so-called "semiprepolymers", i.e. mixtures of NCO prepolymers with other free polyisocyanates, which may have an even higher NCO content, for example up to 40 wt. % may also be used. For practical and economical reasons, as well as the fact that the monomeric amines formed from the monomeric polyisocyanates can be troublesome in a number of applications, semi-prepolymers are not preferred.

The compounds containing free NCO groups in the form of (generally urethane-group-free) modified isocyanates or in the form of (urethane group-containing) NCO prepolymers or "semiprepolymers" have a total NCO group content of from 0.5 to 40 wt. %, preferably of from 1.2 to 25 wt. % and more preferably of from 1.5 to 10 wt. %.

In principle, water may be used in any quantity for hydrolysis. However, if it is desired to obtain complete conversion of the NCO groups into amino groups, it is necessary to use one equivalent of water (which here is understood as one mole of water) per equivalent of NCO groups. If less than one equivalent of water is used, pre-extension occurs with urea formation. Accordingly, it is preferred to use an excess of water, preferably from 1 to 12 equivalents and more preferably from 2 to 10 equivalents. If a large excess of water is used, for example $\geq 25$ equivalents of water per equivalent of NCO, the level of conversion of NCO into $NH_2$ groups generally decreases. Nevertheless, there may be combinations of prepolymer, solvent and catalyst within the scope of the invention in which other concentrations of water lead to optimal yields.

Suitable catalysts for the process of the present invention are, in principle, any basic guanidine and/or amidine compounds, optionally in the form of their salts or complexes. Compounds of this type are described, for example, in the following publications: DE No. 2,447,067, DE No. 3,049,131, DE No. 2,722,514, DE No. 2,434,185, DE No. 1,222,666, DE No. 3,041,834 (EP No. 51 787), DE No. 3,018,023, DE No. 2,439,550, U.S. Pat. No. 3,814,707, DE No. 3,125,438, DE No. 3,126,436 (EP No. 69,295), DE No. 3,003,978 (EP No. 33,879), DE No. 1,745,418 (U.S. Pat. No. 3,769,244), DE No. 1,960,262, Canadian Patent 918,675, U.S. Pat. No. 4,393,149 and, in particular, EP No. 150,803. Further amidines/guanidines which may be used are described by formulae III-VIII in EP-A No. 150,790, especially on pages 18-34.

For reasons of practicability, it is preferred to use commercially available catalysts, for example 1,5-diazabicyclo[4,3,0]-non-5-en (DBN), 1,8-diazabicyclo-[5,4,0]undec-7-en (DBU), tetramethyl guanidine (TMG) or 1,2-dimethyltetrahydropyrimidine:

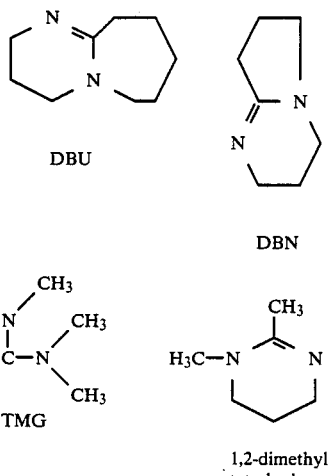

(see Römpp Chemie Lexikon, 8. Auflage, 1981)

In choosing the amidine or guanidine compounds, it is possible to use acyclic compounds, monocyclic compounds containing an exo- or endocyclic C=C double bond or C—N-single bond, bicyclic compounds or other amidine or guanidine compounds if structural-steric constraints in the molecule do not adversely affect the catalytic function.

The quantity of catalyst used is not critical but it should amount to more than 0.001 g of catalyst per 100 g of NCO component to be converted, preferably to between 0.005 and 5 g and more preferably to between 0.1 and 2 g/100 of NCO component. Generally, the degree of conversion depends more upon the quantity of water than upon the quantity of catalyst.

The catalysts used in the present invention are preferably used individually, although it is also possible - if special effects are required - to use mixtures with other catalyst compounds known in isocyanate chemistry.

The water-miscible/water-soluble, aprotic-dipolar solvents used may be selected from the following classes:

(1) water-soluble, aliphatic or cycloaliphatic acid amidines containing from 1 to 10 carbon atoms, for example dimethyl formamide, N-methyl pyrrolidone, dimethyl acetamide, caprolactam, formamide, preferably dimethyl formamide, dimethyl acetamide and N-methyl pyrrolidone:

(2) water-soluble, tetraalkylated aliphatic ureas containing from 4 to 12 carbon atoms, for example tetramethyl ureas or tetraethyl urea:

(3) water-soluble, aliphatic or cycloaliphatic sulfones or sulfoxides containing from 2 to 10 carbon atoms, for example tetramethyl sulfone or dimethyl sulfoxide: and (4) water-soluble, aliphatic or cycloaliphatic phosphoric acid amides, for example hexamethyl phosphoric acid triamide.

The solvents may also be used in admixture in any ratio with one another. Of the solvents mentioned above, it is preferred to use those which boil at 56° to 250° C. (more preferably at 64° to 165° C.) under normal pressure because this simplifies working up.

Preferred water-miscible solvents are dimethyl formamide, dimethyl acetamide, N-methyl pyrrolidone and tetramethylene sulfone. It is particularly preferred to use N,N-dimethyl formamide as the sole solvent.

It is also possible, but not preferred, to use solvents which are not completely miscible with water, such as propionitrile, methylethylketone, ethylacetate or hdrocarbons, in small quantities.

The amount of water-miscible solvent employed in the process of the present invention should be at least 10, preferably at least 50 and more preferably at least 100 parts for every 100 parts of NCO compound in the hydrolysis reaction mixture. Water and solvent should be used in a quantity such that a substantially homogeneous (at most slightly clouded) or preferably a homogenous, clear solution containing the NCO compound is formed at the reaction temperature. It is particularly preferred to use such a quantity of water that a mixture having only one phase, irrespective of the process temperature, is formed.

The catalytically active compounds are generally added to the solvents and water. In some cases, it is possible, but not preferred, to add them to the compound containing isocyanate groups.

To hydrolyze the NCO compound to polyamines having a sufficiently high amine number (high conversion rate), it is advantageous to maintain a concentration of the NCO compound of at least 50 wt. % in the reaction mixture. The higher the degree of dilution by solvent (rather than by water), the better the hydrolysis conversion generally will be. The higher the conversion of the NCO groups into NH$_2$ groups, the higher the amine number of the polyamine. In practice, a dilution limit is imposed solely by economic factors at the working up stage and is for practical reasons at around a 3% solution.

It is important to use at least enough water-miscible solvent for a substantially homogenous and preferably completely homogeneous reaction mixture.

In a less preferred embodiment of this invention, "H-active" compounds containing two or more hydroxy, amino and/or thiol groups may be added to the reaction mixture. These compounds which have already been mentioned include difunctional to optionally tetrafunctional compounds having a molecular weight of from 62 to 2000, more especially those containing at least two primary hydroxy groups, such as ethane diol, butane diol, propane diol, polyethylene glycols, trimethylol propane or the like. Compounds containing different "H-active groups", for example amino alcohols, may of course also be used.

Compounds containing only one H-active group such as methanol, ethanol, cyclohexanol, cyclohexylamine, aniline and asymmetrical dimethyl hydrazine may be used as monofunctional chain terminators.

Pre-extension, (i.e., isocyanate and already formed amine react with chain attachment to ureas) can occur as a secondary reaction in the process of the present invention. These secondary reactions may be largely suppressed by working in dilute solution, using the catalysts required in the present invention and maintaining relatively high reaction temperatures (for example, in the range of from 80° to 130° C.). Although it is desirable that these secondary reactions should occur to the least possible extent, a certain degree of pre-extension is acceptable on economic grounds.

The reaction according to the present invention is preferably carried out in homogeneous phase. By slight overdosage of the quantity of water or of the quantity of NCO compound, slight clouding of the reaction mixture may occur because the starting materials are no longer completely dissolved. However, any excessive addition of water with precipitation of the NCO prepolymer produces inadequate products. The optimal mixing ratios depend upon the starting compounds and may be determined by a few simple preliminary tests.

The reaction may be carried out at temperatures in the range of from 50° to 210° C., although it is preferably carried out at temperatures in the range of from 80° to 130° C., because it is at those temperatures that the best volume/time yields coupled with high solubility and surprisingly very little urea extension are obtained. It is particularly preferred to carry out the reaction at a boiling point of the mixture which, due to the presence of water, is generally in the range of from about 90° to 105° C. In certain cases, it may be necessary to carry out the reaction under pressure in order to obtain sufficiently high temperatures.

The onset of the reaction is reflected in the almost spontaneous elimination of $CO_2$, even at low temperature, for example at temperatures around 30° C. to 40° C. According to the invention, however, it is much more favorable to carry out the reaction at the higher temperatures indicated in order to suppress urea formation. It is important for the reactants to be very thoroughly and rapidly mixed with homogeneous dissolution, which is largely achieved by the use of the solvents. A similar effect is obtained by reduction in viscosity where the reaction is carried out at relatively high temperatures. The reaction may be carried out either continuously or in batches.

In one embodiment of the batch-type process, for example, the compound containing NCO groups is introduced into the aqueous mixture containing solvent and catalyst. This may be done by injection through a nozzle where provisions have been made for uniform distribution by intensive stirring.

In one embodiment of the continuous process, which is particularly suitable for production on an industrial scale, the NCO compounds (optionally in solution) and the aqueous solution are separately delivered to a common reaction zone, intensively mixed and reacted, for example, in a continuous-flow mixer, and rapidly discharged from the mixer. The reactants may be introduced in measured quantities, for example from graduated dropping funnels or by means of a piston and/or diaphragm metering pump or any other metering unit. In the case of continuous metering, it is preferred to mix both components in a very short time (seconds or fractions of a second) using a suitable, optionally motor-driven machine and, on completion of the reaction, to discharge the reaction mixture from the reaction zone.

The reaction of the isocyanate groups with the aqueous, catalyst-containing solvent phase can be facilitated by the presence of various additives. Thus, one or more commercial emulsifiers may be added for homogenization in quantities of for example from 0.01 to 1 parts by weight for every 100 parts of reaction mixture. However, this is unnecessary where homogeneous reaction mixtures (dissolved components) are used.

The continuous-flow mixers which may be used in the continuous embodiments of the process of the present invention include static mixers with fixed mixing elements or dynamic mixers with elements moving on the rotor-stator principle. They may either be heated or cooled. In the case of the static mixes, the necessary mixing energy may be supplied through the pumps whereas, in the case of the dynamic mixers, a separate motor drives the rotor. In every case, the conversion of the isocyanate groups to amino groups depends upon the power applied and the shear forces generated (i.e., upon the homogeneous, rapid distribution of the NCO compound in the reaction medium).

Suitable static mixers include mixers made up of simple mixing elements (for example coils) or complicated elements (for example packing mixers) or multi-channel mixers. It is also possible to use mixing nozzles or the mixing chambers in the HK machines manufactured by the Hennecke Company (Birlinghoven, Federal Republic of Germany) into which the starting products are injected under high pressure (countercurrent injection). Suitable dynamic mixers for the process of the present invention include the continuous-flow mixers which may be used on the stator-rotor principle in the same way as the known impeller homogenizers. The power applied for mixing is generally between about 1 and 10 KW per liter of capacity, depending upon the required degree of dispersion, the type of mixer used and the viscosity of the starting materials.

After mixing, the mixture may be directly worked up into the polyamine, optionally after a brief afterreaction time of generally less than 5 minutes in which the reaction mixture is heated (preferably under normal pressure) in order to remove as much of the carbon dioxide formed as possible. However, the reaction mixture may also be tempered for a longer period without disadvantages, although it is preferably worked up immediately after mixing.

Working up may be carried out continuously or in batches. The reaction mixture is usually worked up by distillation, by extraction, by phase separation or by a combination of these methods.

The volatile constituents are distilled off, optionally under reduced pressure. In general, sump temperatures (in the remaining polyamine) of from 60° to 100° C. are maintained towards the end of evaporation.

Where a thin-layer evaporator is used, distinctly higher temperatures, for example from 170° to 200° C., may be briefly reached in the polyamine.

Extraction processes, optionally after dilution with water, may be carried out with water-insoluble solvents (such as methylene chloride or chlorobenzene) but are not preferred. In some cases, phase separation of the reaction mixture by cooling occurs if hydrolysis has been carried out at relatively high temperatures and in the presence of relatively large quantities of water at the solubility limit. Phase separation may be accomplished or improved by addition of water. The aqueous phase optionally containing solvent and, in most cases, also the catalyst is separated off from the polyamine phase. In most cases, the aqueous phase may then be directly reused.

In addition to the polyamine, the polyamine phase optionally contains residues of the catalyst, a little water and, optionally, water-miscible solvent. These residues are generally removed as far as possible by distillation, optionally in vacuo, or by thin-layer distillation.

If the compound containing NCO groups still contains free, i.e. monomeric, isocyanate from its production, the monomeric amine which is formed therefrom may possibly accumulate to a considerable extent where working up is carried out by phase separation. It may therefore be advisable to remove monomeric amines from the aqueous solution by working up before it is reused.

The reaction mixture is preferably worked up by distilling off the solvent or solvent/water mixture, preferably in a vacuum of, for example, from 1 to 700 Torr, on completion of the reaction (when the evolution of $CO_2$ is over). An even higher vacuum, for example of from 0.001 to 1 Torr, may be applied to remove volatile residues. The distillation process is best carried out initially at a temperature of from 60° to 100° C. and later at a temperature of from 80° to 100° C. The solvent distilled off may be reused.

The polyamines obtained in accordance with the present invention after working up are generally colorless to faintly colored, medium-viscosity to high-viscosity and, optionally, relatively high melting products. Depending upon the starting materials from which they were produced, these polyamines may also contain urethane and/or urea and/or uret dione and/or isocyanurate and/or biuret groups and/or ether and/or acetal and/or carbonate and/or ester and/or thioether and/or dialkylsiloxane groups and/or the residues of polybutadienes which were already present in the NCO compounds. However, additional bonds may be formed through secondary reactions. For example, urea groups may be formed from already hydrolyzed fractions and residual NCO groups during the hydrolysis reaction. The quantity of primary aromatic amino groups present in the polyamines corresponds at most to the quantity of NCO groups in the NCO compounds, i.e. amounts to between 0.19 and 20.3% by weight $NH_2$, preferably to between 0.46 and 11.3% by weight $NH_2$ and more preferably to between 0.58 and 6.7% by weight $NH_2$.

By virtue of their low vapor pressure, the aromatic polyamines obtained in accordance with the invention are preferably used as reactants for optionally blocked polyisocyanates in the production of polyurethanes (polyurethane ureas), optionally cellular polyurethane plastics or polyurethane foams. They may even be combined with other low molecular weight (molecular weight 32 to 399) and/or relatively high molecular weight (molecular weight 400 to approx. 12,000) compounds containing isocyanate-reactive groups. Suitable starting components for the production of polyurethane plastics were mentioned previously in connection with prepolymer production and are also described in DE-A No. 2,302,564, DE-A No. 2,432,764 (U.S. Pat. No. 3,903,679) and in DE-AS Nos. 2,639,083, 2,512,385, 2,513,815, 2,550,796, 2,550,797, 2,550,833, 2,550,860 and 2,550,862. Auxiliaries and additives which may optionally be used in the production of polyurethanes are also mentioned in these publications.

The present invention also relates to the use of the polyamines produced in accordance with the invention for the production of polyurethane(urea)s. It is possible to produce elastomers, coatings, filaments from melts, solutions, dispersions or mixtures of reactive components by using the polyamines of the present invention.

The polyamines produced in accordance with the invention may also be used, for example, as coupling components for diazo dyes, as hardeners for epoxy and phenolic resins and in any other known reactions involving amines, such as amide- or imide-forming reactions.

The process according to the invention is illustrated by the following Examples in which quantities are expressed in parts by weight or percentages by weight, unless otherwise indicated.

EXAMPLES

The NCO component used in each of the following Examples 1-5 was an NCO prepolymer of tolylene-2,4-diisocyanate and a polypropylene glycol having an OH number of 56, prepared by stirring for 3 hours at 80° C.; NCO content 3.3%.

EXAMPLE 1

500 g of the above-described prepolymer were added dropwise over a period of 20 minutes with evolution of $CO_2$ to a mixture heated to 90° C. of 1.1 liters of dimethyl formamide (DMF), 250 g of water and 1 g of diazabicyclononene (DBN). After the evolution of $CO_2$ had stopped, DMF and water were distilled off. The amine product had an NH number of 36 mg KOH/g ($HClO_4$/acetic acid).

EXAMPLE 2

The procedure was the same as in Example 1, with the exception that only 25 g (instead of 250 g) of water were used.

NH number ($HClO_4$/acetic acid) : 49 mg KOH/g
NH number (acetanhydride/pyridine, 24 h, 80° C.): 49.2 mg KOH/g Acid number: 0.2 mg KOH/g.

EXAMPLE 3

The procedure was the same as in Example 2, with the exception that 1 g of tetramethylguanidine was used (instead of 1 g of DBN).

NH number ($HClO^4$/acetic acid): 45.9 mg KOH/g.

EXAMPLE 4

The procedure was the same as in Example 2, with the exception that 1 g of 1,2-dimethyltetrahydropyridine was used (instead of 1 g of DBN).

NH number ($HClO_4$/acetic acid): 44.9 mg KOH/g.

EXAMPLE 5

The procedure was the same as in Example 2, with the exception that 1 g of N-cyclohexyl-1-methyltetrahydropyrimidine was used (instead of 1 g of DBN).

NH number ($HClO_4$/acetic acid): 47.1 mg KOH/g.

EXAMPLES 6-10

Examples 6-10 were carried out with an isocyanate prepolymer prepared from the same materials as the prepolymer used in Examples 1 to 5, but with an NCO content of 3.6%.

EXAMPLE 6

(Comparison following DE-OS No. 3,223,398)

500 g of the above-described prepolymer were added with stirring over a period of 20 minutes to a mixture heated to 90° C. of 1050 g of dimethyl formamide, 50 g of water and 1.9 g of triethylamine. After the evolution of gas had stopped, DMF, water and tertiary amine were distilled off first at 20 mbar and then at 0.13 mbar/100° C. The polyamines, prepared with this tertiary amine catalyst gave lower (less preferred) NH-numbers:

NH-number: 39.6 mg KOH/g.

EXAMPLE 7

Comparison following DE-OS No. 3,223,398)

The procedure was the same as in Example 6, with the exception that 0.5 g of triethylamine was used (instead of 1.9 g of triethylamine).

NH-number: 35.3 mg KOH/g (a relatively low NH-number)

EXAMPLE 8

The procedure was the same as in Example 6, with the exception that 1 g of diazabicycloundecene (DBU) was used (instead of triethylamine).

NH number 47.3 mg KOH/g.

EXAMPLE 9

The procedure was the same as in Example 6 with the exception that 0.1 g of diazabicycloundecene (DBU) was used (instead of triethylamine). Even in this very low concentration, the catalyst according to the invention gave a polyamine with improved (high) NH-number, compared with comparison Example 7.

NH-number: 43.8 mg KOH/g.

EXAMPLE 10

The procedure was the same as in Example 6, with the exception that 1.5 g of diazabicycloundecene (DBU) were used as a catalyst (instead of triethylamine) and the reaction temperature was 35° C. (instead of 90° C.). A polyamine with improved (higher) NH-number was obtained.

NH-number: 42.1 mg KOH/g.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A single stage process for the production of polyamines containing aromatically bound primary amino groups in which (a) a compound containing aromatic NCO groups having an NCO content of from 0.5 to 40 wt. % is hydrolyzed with
    (b) water in the presence of
    (c) at least one compound containing an amidine and/or guanidine group in a quantity of at least 0.001 parts by weight for every 100 parts by weight of compound (a) and
    (d) a water-miscible, aprotic-dipolar solvent in a quantity of at least 10 parts by weight for every 100 parts by weight of compound (a) in substantially homogeneous phase at a temperature of from 20° to 210° C.

2. The process of claim 1 in which compound (a) has an NCO content of from 1.2 to 25 wt. %.

3. The process of claim 1 in which compound (a) has an NCO content of from 1.5 to 15 wt. %.

4. The process of claim 3 in which compound (c) is selected from diazabicycloalkenes, tetrahydropyrimidines and tetra-alkyl guanidines.

5. The process of claim 1 in which compound (c) is selected from diazabicycloalkenes, tetrahydropyrimidines and tetraalkyl guanidines.

6. The process of claim 1 in which compound (c) is in substantially dissolved form.

7. The process of claim 1 in which the water (b) is used in a quantity which is from 1 to 10 times the stoichiometric quantity, based on NCO groups.

8. The process of claim 1 in which solvent (d) is selected from compounds containing carboxylic dialkylamides and/or lactam and/or tetra alkyl urea and/or sulfone and/or sulfoxide and/or phosphorus dialkylamide groups which boil at a temperature of from 56° to 250° C.

9. The process of claim 8 in which the solvent (d) is used in a quantity of at least 50 parts by weight for every 100 parts by weight of compound (a).

10. The process of claim 1 in which the hydrolysis is carried out at a temperature of from 75° to 135° C.

11. The process of claim 1 in which the compound (a) is an NCO prepolymer having an NCO content of from 1.5 to 15 wt. %.

12. The process of claim 11 in which the NCO prepolymer is based upon a relatively high molecular weight difunctional or trifunctional polyether, polyester, polycarbonate or polycaprolacton polyol.

13. The process of claim 1 in which hydrolysis is carried out on a continuous basis.

14. A polyamine having from 0.58 to 6.7 wt. % of aromatically bound primary amino groups which is produced by the process of claim 1.

15. A process for the production of polyisocyanate addition products in which a polyisocyanate is reacted with a polyamine produced by he process of claim 1.

* * * * *